Oct. 16, 1956   E. S. SHANLEY   2,766,838
MONITORING GAS-LIQUID SYSTEMS
Filed May 1, 1952   2 Sheets-Sheet 1

INVENTOR.
EDWARD S. SHANLEY
BY
Bean, Brooks, Buckley & Bean.
ATTORNEYS

INVENTOR.
EDWARD S. SHANLEY
BY

*Bean, Brooks, Buckley & Bean*
ATTORNEYS

United States Patent Office 2,766,838
Patented Oct. 16, 1956

2,766,838
MONITORING GAS-LIQUID SYSTEMS

Edward S. Shanley, Kenmore, N. Y., assignor, by mesne assignments, to Food Machinery and Chemical Corporation, San Jose, Calif., a corporation of Delaware Application May 1, 1952, Serial No. 285,585
5 Claims. (Cl. 181—.5)

This invention pertains to a method of monitoring solutions for the release of gases therefrom.

The term "monitoring" is used here as meaning "to listen to signals by means of receiving apparatus," and this term as used in this disclosure means more particularly to listen to signals accompanying the gas release from solutions, which phenomenon will be described in more detail later on.

Gases formed in or introduced into a solution will be released from that solution once the solubility limit of the particular gas in the particular solution has been exceeded. It is often of technological importance to be advised of incipient gas release from a solution, or of termination of gas release or of an increase or decrease of the rate of continuous gas release. This is particularly so in those cases where the gas release is indicative of reactions or changes taking place in a solution. Thus, incipient gas release may be, and often is, the first indication of chemical instability of a solution. Inversely, termination of gas release may indicate that a desired or undesired reaction in the solution has come to an end. Variations in rate of gas release are often correlated with variations in reaction rate of a reaction occurring in the solution.

Desirable, as well as undesirable changes in solutions, may of course be ascertained by a variety of means and methods. Continuous chemical analysis will reflect changes taking place in a solution, but requires elaborate equipment or continuous employment of manpower. Moreover, many solutions of complicated composition do not lend themselves readily to speedy chemical analysis. Strongly exothermic or strongly endothermic reactions taking place in a solution may be detected by means of thermometers. However, an objectionable time lag may be observed between the moment of incipient reaction and the moment of registration of the concomitant temperature change by a thermometer. Changes in ambient temperature will moreover affect the reliability of thermometric solution control.

If solutions are kept in closed systems, pressure rise, due to gas release from the solution, may be indicated by a suitable pressure gauge, thus advising of chemical changes in the solution. If such gauges are made sensitive enough to indicate the very small rise of pressure due to incipient gas release, the gauges will be affected also by pressure changes in the system induced by changes in ambient temperature and thus give misleading pressure information. If the gauges are not sensitive enough to respond to pressure changes induced in the system by outside temperature changes, then their sensitivity will be too low to indicate, as they should, small pressure changes in the system due, e. g., to incipient gas release.

The disadvantages connected with the use of pressure gauges to monitor solutions for the release of gases are even more pronounced if flow meters are used to indicate the gassing behavior of solutions, especially if incipient or very slow gas release is to be ascertained.

The information obtained when using pressure gauges, flow meters or thermometers to monitor solution behavior becomes still more misleading if the solutions are at a higher than ambient temperature. This is particularly true for pressure gauges and flow meters because of the so-called breathing of solution containers. If a hot solution is kept in a closed system and permitted to cool, a negative pressure can easily result even while chemical changes in the solution are causing incipient gas release. In such a case, neither pressure gauges nor flow meters can give true information on solution behavior. In the same way, cooling of a hot solution will often overshadow temperature changes due to exothermic or endothermic changes taking place in the solution, which changes would go undetected if thermometers were used to monitor solution behavior. Pressure gauges and flow meters can moreover be used in closed systems only, which fact further reduces their utility.

Visual observation of a solution for gassing behavior is not feasible as a rule. It is impractical in many technical installations and particularly so if solution behavior is to be observed over prolonged periods of time.

It is the main object of this invention to provide a novel method to monitor solutions for the release of gases therefrom.

I have now found that the release of a gas from a solution is accompanied by a sonic effect. It is believed that this sonic effect is produced by bubbles of gas which, after solubility limits have been exceeded, form, rise in and finally break through the surface of the solution. It seems to be the break-through at the surface of the solution which actually produces this sonic effect. The sound thus produced may be picked up by a listening device, such as one or more microphones, and the microphone output, after suitable amplification, may then be used to produce a visible or audible signal of which, if desired, a continuous record may be made by means of a recording device.

This sonic effect is of measurable magnitude at a moment in time, at which other physical changes in solution behavior are not yet significant. If, for instance, an unstable solution in bulk storage undergoes decomposition, the sonic effect of gas release from that solution is detectable much earlier than the effects of pressure and/or temperature changes over and in the solution. Whereas decomposition must take place for appreciable periods of time to cause an unmistakable rise in solution temperature or gas space pressure, particularly if a large volume of solution, therefore, large containers are involved, gas release due to incipient reaction can be detected by its sonic effects. By the term "incipient reaction" I particularly mean that stage of a reaction where the reaction taking place in the solution already causes release of gaseous decomposition products but where thermal and/or pressure changes due to that chemical reaction have not yet become significant.

Inversely, cessation of gas release from a solution in which a desired chemical reaction is taking place, will often be observable at a time when temperature or pressure changes of solution behavior have already become insignificant.

The rate of gas release caused by gas forming changes occurring in a solution is moreover a function of the rate at which such changes take place. It is therefore possible to use the sonic effect of gas release as a measure of the rate of reaction in a solution.

The following examples will serve to illustrate the principle of my invention. This principle will be found applicable in numerous cases not described by these examples, and the scope of my invention is, therefore, not to be limited by the examples but only by the appended claims.

The equipment used in the following examples consisted of a container filled to about ⅔ of its capacity, with the solution to be monitored. The container was closed by means of a tight-fitting cover equipped with a gas outlet tube. Attached to the underside of the cover was a microphone, the leads of which passed through gasket equipped holes in the cover to the outside. The rate of a reaction set up in the solution to be monitored was measured by measuring the amount of gas developed in a given time. This was done by connecting the gas outlet tube to a sensitive, calibrated flow meter. At the same time, sound intensity measurements were made by connecting the microphone to an audio amplifier of conventional design. An A. C. voltmeter was used to measure amplifier output, which could then be expressed in decibel units of sound intensity.

EXAMPLE 1

*Monitoring for carbon dioxide release*

Carbon dioxide was generated by adding a solution of a mineral acid to a solution of sodium bicarbonate. Depending on acid flow, carbon dioxide was generated at rates varying from about 350 ml. per minute to about 2000 ml. per minute. Flow meter readings and decibel readings were taken, the flow meter readings serving as the primary measure of reaction rate. The following test results were obtained:

| ml. $CO_2$ developed per minute | g. $NaHCO_3$ decomposed per minute | mols $CO_2$ developed per minute | Sound intensity in decibels |
| --- | --- | --- | --- |
| 380 | 1.5 | 0.017 | −8.0 |
| 580 | 2.3 | 0.026 | −5.5 |
| 780 | 3.1 | 0.035 | −3.0 |
| 1,150 | 4.5 | 0.052 | −0.75 |
| 1,750 | 6.9 | 0.078 | 2.0 |
| 1,850 | 7.3 | 0.083 | 2.5 |

Monitoring process solutions for carbon dioxide release is of practical importance in fermentation processes wherein alcohol is a product of the fermentation. In continuous multi-tub fermentation, for instance, the fermentation reaction slows down in the last tub to such an extent that carbon dioxide evolution is not sufficient anymore to keep the yeast in suspension. Here, to prevent the yeast from settling, artificial agitation becomes necessary. Monitoring the solution in this tank for gas evolution permits one to ascertain the point in time where mechanical agitation of the tank contents has to be resorted to. The data in Example 1, for instance, shows that the audio method detects as little as 0.017 mol per minute of $CO_2$, corresponding to the fermentation of 1.53 grams of glucose per minute.

EXAMPLE 2

*Monitoring for nitrogen release*

A 2:1 mixture of nitrogen and carbon dioxide was generated by mixing approximately equal volumes of a 10% solution of sodium nitrite and a 10% solution of urea and subsequently lowering the pH of the mixture by gradual addition of a mineral acid. In this manner, a gradually increasing rate of gas release was obtained, ranging from about 200 ml. per minute to about 7000 ml. per minute. Flow meter readings and decibel readings were taken, the flow meter readings serving as the primary measure of reaction rate. The following test results were obtained:

| ml. gas mixture developed per minute | Mol (gas mixture) produced per min. | Sound intensity in decibels |
| --- | --- | --- |
| 200 | 0.009 | −18.5 |
| 375 | 0.017 | −15 |
| 620 | 0.028 | −11 |
| 1,350 | 0.060 | −9.5 |
| 2,750 | 0.124 | −5.5 |
| 7,000 | 0.314 | −2 |

Monitoring process solutions for nitrogen release is of practical importance in dealing with solutions of diazo compounds, as used in the manufacture and use of many dyes. The stability of these solutions depends mainly on pH and temperature and their decomposition results in the release of nitrogen. Once an experimental graph has been made by plotting per cent diazo compound decomposed versus milliliter of nitrogen released under a given set of conditions and for a given diazo compound, automatic recording of the stability of subsequent batches of processing solution is possible by applying the monitoring principle of this invention.

In the above example, for instance, substituting the industrially important 1-diazo-2-hydroxynaphthalene-4-sulfonic acid for the reagents employed in the example, the sound intensity in decibels as a measure of nitrogen evolution would indicate the following stability behavior of a solution of this particular diazo compound:

| Sound intensity in decibels | Mol diazo compound decomposing per minute |
| --- | --- |
| −18.5 | 0.009 |
| −15 | 0.017 |
| −11 | 0.028 |
| −9.5 | 0.060 |
| −5.5 | 0.122 |
| −2 | 0.312 |

Thus, considering a 500 kg. batch of this particular diazo compound, a decibel reading of −18.5 would correspond to a loss of 0.22% by weight of the diazo compound over an 8 hour working day, which loss is economically not significant. A decibel reading of −5.5, on the other hand, would correspond to the economically significant loss of nearly 3% of diazo compound over an 8-hour working day. In this example, the monitor might be set to actuate a warning device at a reading of perhaps −10 db, to tell the operator that a temperature or pH adjustment of the batch is required. Or the output of the audio amplifier, instead of being used to give an audible or visible signal, might be used to actuate a pH regulator to bring the batch back to the required pH level by the admission to the batch of acid or alkali, as required.

EXAMPLE 3

*Monitoring for oxygen release*

A 30% solution of hydrogen peroxide was monitored for oxygen release. In this test the same apparatus was used as previously described, but the container cover moreover contained another gasket equipped small hole, through which a thin rod passed. This rod, long enough to reach well into the solution in the container, held at its lower end a small strip of a highly active metal catalyst preparation, capable of producing hydrogen peroxide decomposition with concomitant release of oxygen gas. Moving the rod up or down permitted partial or complete immersion or complete withdrawal of the catalyst from the solution. Thus, positioning the catalyst permitted one to obtain a variety of decomposition rates, corresponding in this test to rates of gas release ranging from about 200 ml. per minute to about 2600 ml. per minute. Flow meter readings and decibel readings were taken, the flow meter readings serving as the primary measure of decomposition rate. The following test results were obtained:

| ml $O_2$ developed per minute | lbs. $H_2O_2$ decomposed per minute | Sound intensity in decibels |
| --- | --- | --- |
| 200 | 0.0013 | −7 |
| 550 | 0.0037 | −5 |
| 850 | 0.0057 | −3.9 |
| 1,250 | 0.0082 | −2.3 |
| 2,600 | 0.0172 | 2.7 |

In today's commercial practice, hydrogen peroxide solutions are frequently stored at the point of manufacture in tanks holding as much as 5,000 gallons and more. Although very stable as such, hydrogen peroxide solutions may undergo a self-accelerating, strongly exothermic decomposition reaction due to effects of chance contamination. Incipient decomposition, characterized by the lack of easily detectable phenomena save the release of small quantities of oxygen gas, can usually be stopped, if detected in time. Once decomposition has progressed to the stage where the bulk of the solution begins to heat up because of the exothermic decomposition reaction, effective countermeasures are then not ordinarily possible. A simple, safe and reliable method of detecting incipient decomposition is, therefore, important and is given by the monitoring principle of my invention.

The data of Example 3 show that the sound corresponding to a decomposition rate of only 0.0013 lb. $H_2O_2$/min. is readily measurable. This decomposition rate in a conventional tank holding, for example, 50,000 lbs. of a commercial 50% solution of hydrogen peroxide corresponds to a loss of about 680 lbs. of $H_2O_2$ per year or a loss of 2.7% per year. A loss figure of this order is industrially acceptable for long term storage under conditions where chance contamination does not occur. The method of my invention is, therefore, sensitive enough to detect commercially acceptable decomposition rates and will easily indicate variations in that rate. Should decomposition rate as measured be found to exceed an acceptable base rate, prompt and efficient initiation of countermeasures can be taken with avoidance of losses and possibly serious consequences of decomposition going on unchecked because of being undetected in its incipient stages.

Thus, as shown by these examples, the method of my invention permits one to detect incipient gas release, cessation of gas release and changes in gas release rate in many diverse systems. The method is sensitive, yet not affected by external conditions of pressure or temperature, and lends itself to automatic signaling or recording of readings.

In the drawings, Figs. 1, 2 and 3 are graphs of sound intensity in decibels as ordinate plotted against decomposition or gas evolution as abscissa, while Fig. 4 is a schematic showing of an installation of the present invention.

Referring more particularly to the drawing, Fig. 4 shows schematically a suitable detection system. A vessel 10, which may be a storage tank, process container or reactor, contains the solution 11 to be monitored. A microphone 12 is attached to the inside of the vessel at a portion above the liquid level and directed toward the surface of the said liquid. The tank may also be equipped with a pressure relief valve 14 if desired.

Microphone 12 is electrically connected to any conventional form of audio amplifier 15 and the amplified energy is used to actuate any preferred form of signaling or recording device. Thus, a recording voltmeter may be connected in the circuit and, if desired, a permanent record of the sonic energy level may be made and, if desired, this may be compared with a predetermined safe level so that mere inspection will indicate in the recording, any increase or decrease in gas release above or below the predetermined "acceptable" or normal level for the particular solution in a given environment. Alarms and/or automatic controls can also be added according to well-known methods, the automatic controls mechanically actuating valving mechanism which may admit reagents to the bath to regulate the reaction occurring therein to a "safe" or desired rate or level.

Fig. 2 is a graphical representation of the sound intensity of the mixed nitrogen and carbon dioxide gas, the data for which is found in Example 2, while

Figure 1:
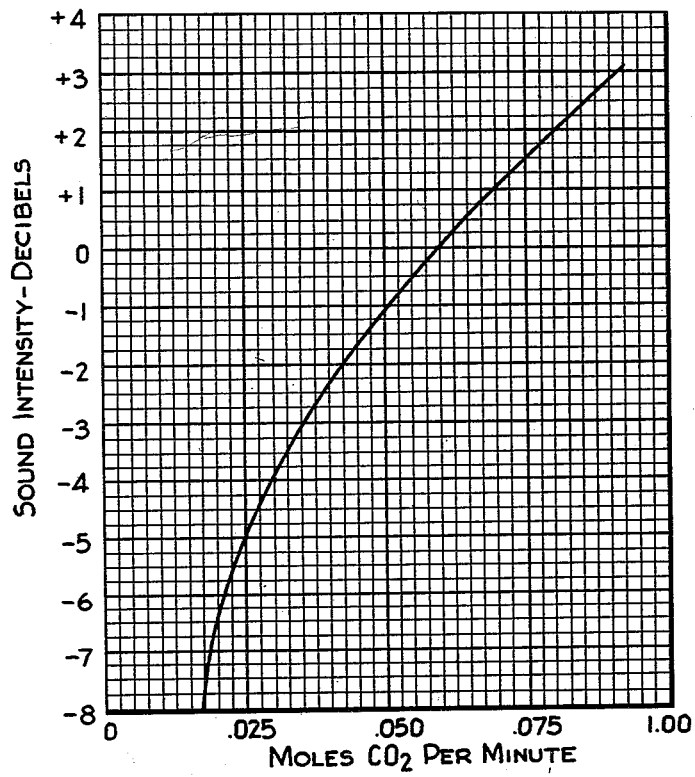
Fig. 1 represents the sound intensity associated with the release of specified moles of carbon dioxide per minute, at a disengaging solution surface and is a graphical representation of the data of Example 1.
Figure 2:
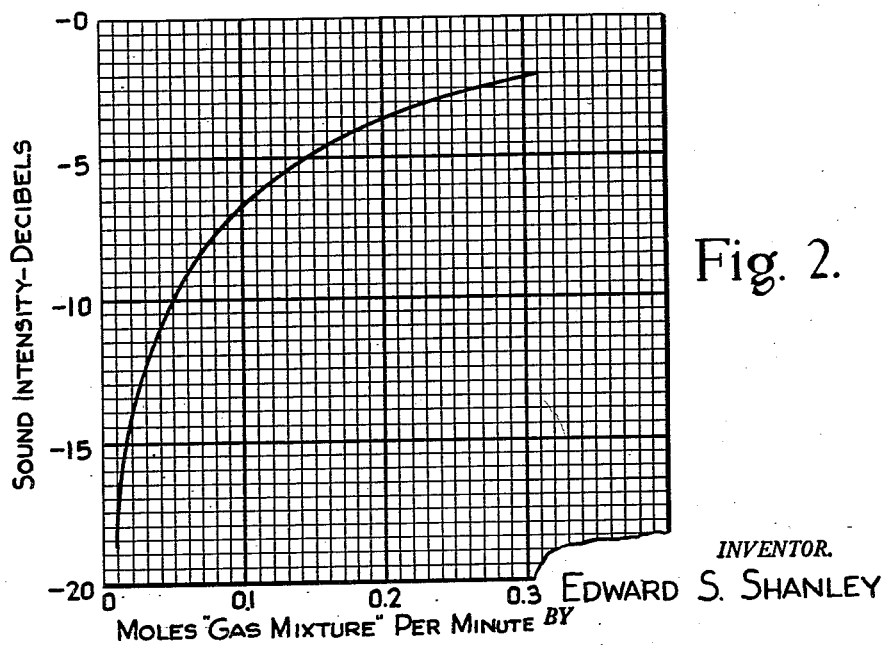
Figure 3:
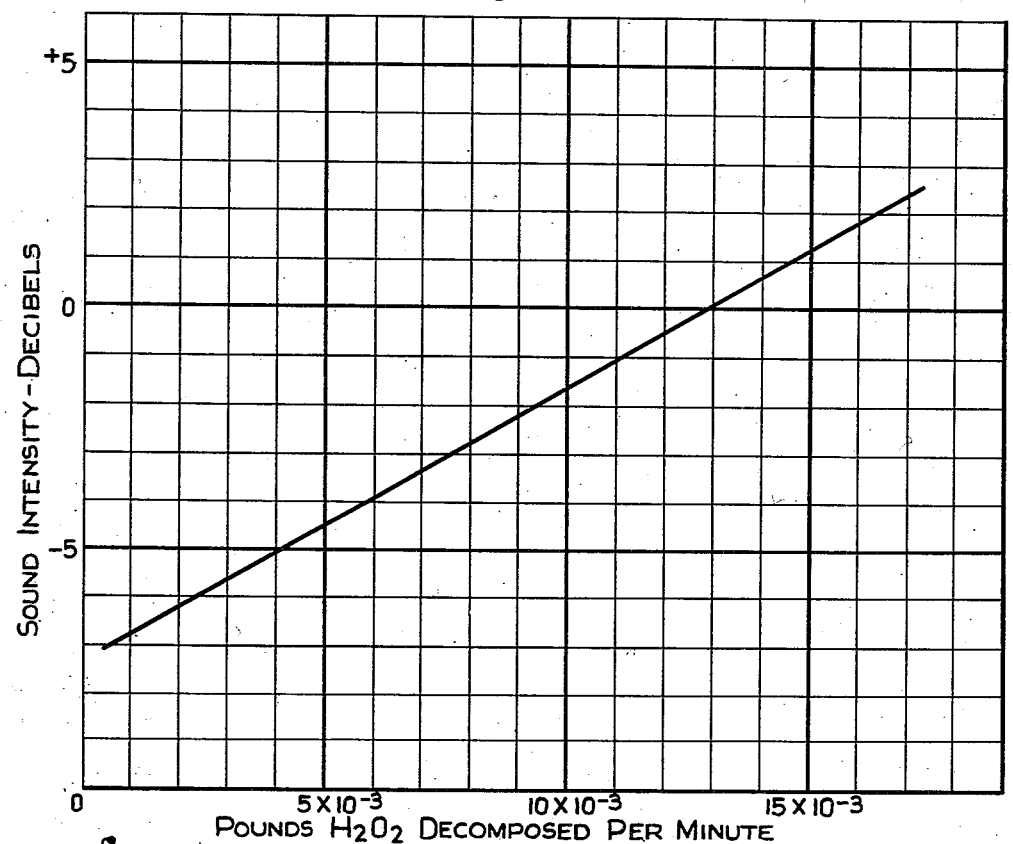
Fig. 3 shows the pounds of $H_2O_2$ decomposed per minute and the associated sound intensity.
Figure 4:
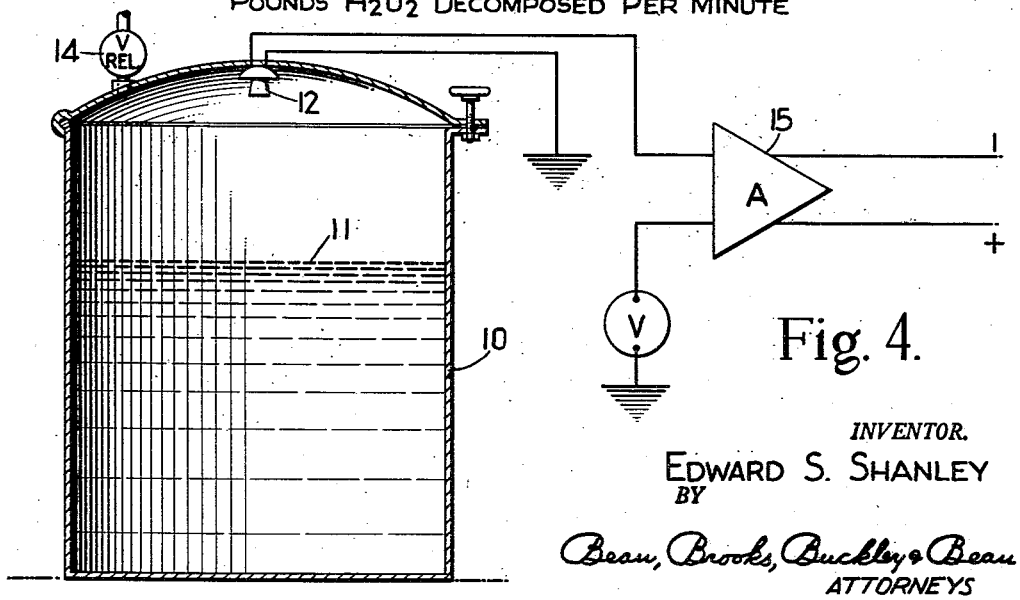

With graphs of this character determined for any gas-liquid system, a simple comparison will indicate the safe level of sound intensity associated with gas disengagement and, therefore, reaction rate within the system at a sensitivity not obtainable by the presently employed temperature or pressure responsive devices.

What is claimed is:

1. The method of continuously and quantitatively monitoring a solution wherein the solution has a free surface and is undergoing chemical change resulting in gas formation in the solution and disengagement of the gas from the free surface of the solution, which comprises maintaining the vapor pressure at said surface at a substantially constant level, picking up directly and discriminating in favor of the sound vibrations in the space above said free surface produced by disengagement of gas bubbles from the surface of said solution, subjecting said sound to a predetermined audio amplification and measuring the intensity of said sound at the predetermined amplification as a function of the rate of escape of gas from said free surface and thus of the rate of chemical change of the solution.

2. The method of continuously and quantitatively monitoring a solution wherein the solution has a free surface and is undergoing chemical change resulting in formation of carbon dioxide in the solution and disengagement of carbon dioxide from the free surface of the solution, which comprises maintaining the vapor pressure at said surface at a substantially constant level, picking up directly and discriminating in favor of the sound vibrations in the space above said free surface produced by disengagement of gas bubbles from the surface of said solution, subjecting said sound to a predetermined audio amplification and measuring the intensity of said sound at the predetermined amplification as a function of the rate of escape of carbon dioxide from said free surface and thus of the rate of chemical change of the solution.

3. The method of continuously and quantitatively monitoring a solution wherein the solution has a free surface and is undergoing chemical change resulting in the formation of nitrogen in the solution and disengagement of nitrogen from the free surface of the solution, which comprises maintaining the vapor pressure at said surface at a substantially constant level, picking up directly and discriminating in favor of the sound vibrations in the space above said free surface produced by disengagement of gas bubbles from the surface of said solution, subjecting said sound to a predetermined audio amplification and measuring the intensity of said sound at the predetermined amplification as a function of the rate of escape of nitrogen from said free surface and thus of the rate of chemical change of the solution.

4. The method of continuously and quantitatively monitoring a solution wherein the solution has a free surface and is undergoing chemical change resulting in the formation of oxygen in the solution and disengagement of oxygen from the free surface of the solution, which comprises maintaining the vapor pressure at said surface at a substantially constant level, picking up directly and discriminating in favor of the sound vibrations in the space above said free surface produced by disengagement of gas bubbles from the surface of said solution, subjecting said sound to a predetermined audio amplification and measuring the intensity of said sound at the predetermined amplification as a function of the rate of escape of oxygen from said free surface and thus of the rate of chemical change of the solution.

5. The method of continuously and quantitatively monitoring a hydrogen peroxide solution in storage and wherein the solution has a free surface and is undergoing chemical change resulting in the formation of oxygen in the solution and disengagement of oxygen from the free surface of the solution, which comprises maintaining the vapor pressure at said surface at a substantially constant level, picking up directly and discriminating in favor of the sound vibrations in the space above said free surface produced by the disengagement of oxygen gas bubbles at the surface of the solution, subjecting said sound to a predetermined audio amplification and measuring the intensity of said sound at the predetermined amplification as a function of the rate of escape of oxygen from said free surface and thus of the rate of chemical change of the solution.

References Cited in the file of this patent

UNITED STATES PATENTS

| | | |
|---|---|---|
| 2,008,934 | Smith | July 23, 1935 |
| 2,021,774 | Gilmore | Nov. 19, 1935 |
| 2,210,417 | Kinley | Aug. 6, 1940 |
| 2,310,783 | Helmbold | Feb. 9, 1943 |
| 2,614,645 | Wilhelm | Oct. 21, 1952 |